(12) United States Patent
Lee et al.

(10) Patent No.: US 12,346,811 B2
(45) Date of Patent: Jul. 1, 2025

(54) TRAINING METHOD OF GENERATOR NETWORK MODEL AND ELECTRONIC DEVICE FOR EXECUTION THEREOF

(71) Applicant: PEGATRON CORPORATION, Taipei (TW)

(72) Inventors: Kuan-Lin Lee, Taipei (TW); Jun-Ying Li, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 727 days.

(21) Appl. No.: 17/739,008

(22) Filed: May 6, 2022

(65) Prior Publication Data

US 2023/0022256 A1 Jan. 26, 2023

(30) Foreign Application Priority Data

Jul. 20, 2021 (TW) ................................. 110126673

(51) Int. Cl.
*G06N 3/08* (2023.01)
*G06N 3/045* (2023.01)
*G06T 5/20* (2006.01)
*G06V 10/74* (2022.01)
*G06V 10/82* (2022.01)

(52) U.S. Cl.
CPC .............. *G06N 3/08* (2013.01); *G06N 3/045* (2023.01); *G06T 5/20* (2013.01); *G06V 10/761* (2022.01); *G06V 10/82* (2022.01); *G06T 2207/20024* (2013.01)

(58) Field of Classification Search
CPC ........ G06N 3/08; G06N 3/045; G06N 3/0475; G06N 3/094; G06T 5/20; G06T 2207/20024; G06T 11/00; G06V 10/761; G06V 10/82

USPC ......................................................... 382/157
See application file for complete search history.

(56) References Cited

U.S. PATENT DOCUMENTS

2019/0149425 A1   5/2019  Larish et al.
2022/0351523 A1* 11/2022  Kim ....................... G06V 10/82

FOREIGN PATENT DOCUMENTS

| CN | 108334849 A | * | 7/2018 |
| CN | 109871898 | | 6/2019 |
| CN | 110569721 | | 12/2019 |
| CN | 111986069 | | 11/2020 |
| CN | 109919890 B | * | 1/2023 |
| EP | 3848904 A1 | * | 7/2021 |

(Continued)

*Primary Examiner* — Charlotte M Baker
(74) *Attorney, Agent, or Firm* — J.C. PATENTS

(57) ABSTRACT

A training method of a generator network model and an electronic device for execution thereof are provided. The training method includes: extracting a first tensor matrix and a second tensor matrix, wherein the first tensor matrix and the second tensor matrix respectively represent a first picture and a second picture and individually include a plurality of first parameters and a plurality of second parameters; generating a plurality of third pictures according to a plurality of difference values between the first parameters of the first tensor matrix and the second parameters of the second tensor matrix; performing a similarity test on a plurality of original pictures and the plurality of third pictures; and adopting at least one of the third pictures whose similarity is lower than or equal to a similarity threshold as at least one new sample picture.

18 Claims, 4 Drawing Sheets

(56) References Cited

FOREIGN PATENT DOCUMENTS

| WO | WO-2017095948 A1 | * | 6/2017 |
| WO | WO-2021045976 A1 | * | 3/2021 |

* cited by examiner

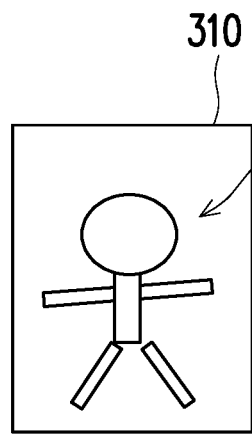
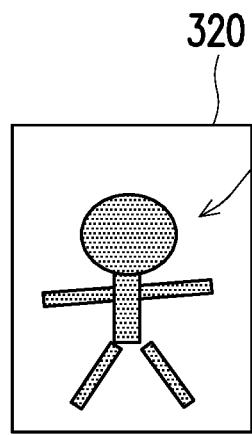
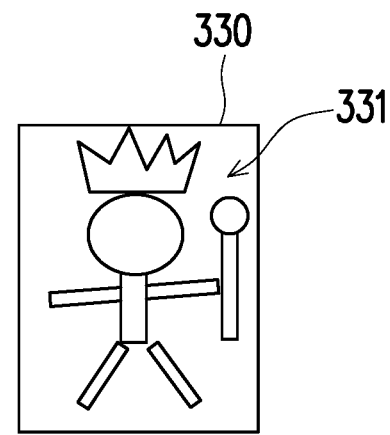
FIG. 3A  FIG. 3B  FIG. 3C
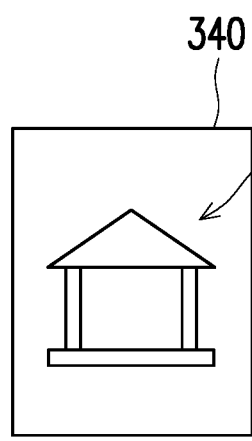
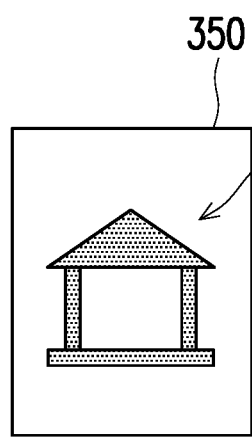
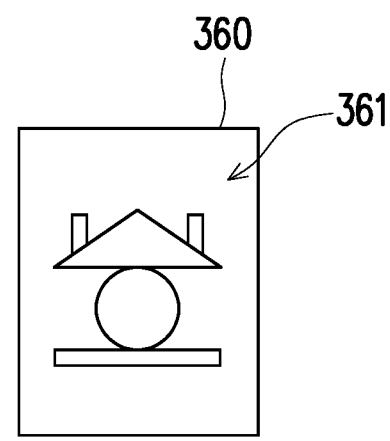
FIG. 3D  FIG. 3E  FIG. 3F

TRAINING METHOD OF GENERATOR NETWORK MODEL AND ELECTRONIC DEVICE FOR EXECUTION THEREOF

CROSS-REFERENCE TO RELATED APPLICATION

This application claims the priority benefit of Taiwanese application no. 110126673, filed on Jul. 20, 2021. The entirety of the above-mentioned patent application is hereby incorporated by reference herein and made a part of this specification.

BACKGROUND

Technical Field

The disclosure relates to a model improvement method and a device applying a neural network computation technology, and in particular, to a training method of a generator network model in a generative adversarial network (GAN) model and an electronic device for execution of the generator network model.

Description of Related Art

Generally, a generative adversarial network (GAN) model is configured to automatically illustrate a picture with a pattern that is highly similar to an actual object. After a generator network model and a discriminator network model of the generative adversarial network model are respectively trained and contest with each other through an original training data set, a pattern in a picture generated by a generator can be more and more similar to a pattern of an actual object. Hence, the picture generated by an optimized generator can be regarded as the pattern of the actual object by the discriminator network model. However, since a conventional generative adversarial network model only generates a picture whose pattern is almost the same as or highly similar to an original picture in the original training data set, it is unable to generate a picture with pattern characteristic variety. Therefore, the conventional generative adversarial network model does not have a function of generating creative and new pictures.

SUMMARY

The disclosure is directed to a training method of a generator network model and an electronic device for execution of the generator network model capable of providing a trained generator network model with a function of generating a creative new picture.

A training method of a generator network model of the disclosure includes the following. A first tensor matrix and a second tensor matrix are extracted. The first tensor matrix and the second tensor matrix respectively represent a first picture and a second picture and respectively include multiple first parameters and multiple second parameters. Multiple third pictures are generated according to multiple difference values between the multiple first parameters of the first tensor matrix and the multiple second parameters of the second tensor matrix. A similarity test is performed on multiple original pictures and the multiple third pictures. At least one of the multiple third pictures whose similarity is lower than or equal to a similarity threshold serves as at least one new sample picture.

An electronic device of the disclosure is adapted for execution of a generator network model. The electronic device includes a storage device and a processor. The storage device is configured to store the generator network model. The processor is coupled to the storage device. The processor is configured to execute the generator network model. The processor extracts a first tensor matrix and a second tensor matrix from the generator network model. The first tensor matrix and the second tensor matrix respectively represent a first picture and a second picture and respectively include multiple first parameters and multiple second parameters. The processor generates multiple third pictures according to multiple difference values between the multiple first parameters of the first tensor matrix of the first picture and the multiple second parameters of the second tensor matrix of the second picture. The processor performs a similarity test on multiple original pictures and the multiple third pictures. The processor adopts at least one of the multiple third pictures whose similarity is lower than or equal to a similarity threshold as at least one new sample picture.

Based on the above, in the training method of the generator network model and the electronic device for execution of the generator network model of the disclosure, multiple sample pictures with pattern characteristics changing gradually may be generated.

In order to make the aforementioned features and advantages of the disclosure comprehensible, embodiments accompanied with drawings are described in detail below.

BRIEF DESCRIPTION OF THE DRAWINGS

FIG. 3A is a schematic diagram of an original picture according to an embodiment of the disclosure.

FIG. 3B is a schematic diagram of a first picture according to an embodiment of the disclosure.

FIG. 3C is a schematic diagram of a third picture according to an embodiment of the disclosure.

FIG. 3D is a schematic diagram of another original picture according to an embodiment of the disclosure.

FIG. 3E is a schematic diagram of a second picture according to an embodiment of the disclosure.

FIG. 3F is a schematic diagram of another third picture according to an embodiment of the disclosure.

DESCRIPTION OF THE EMBODIMENTS

Figure 1:
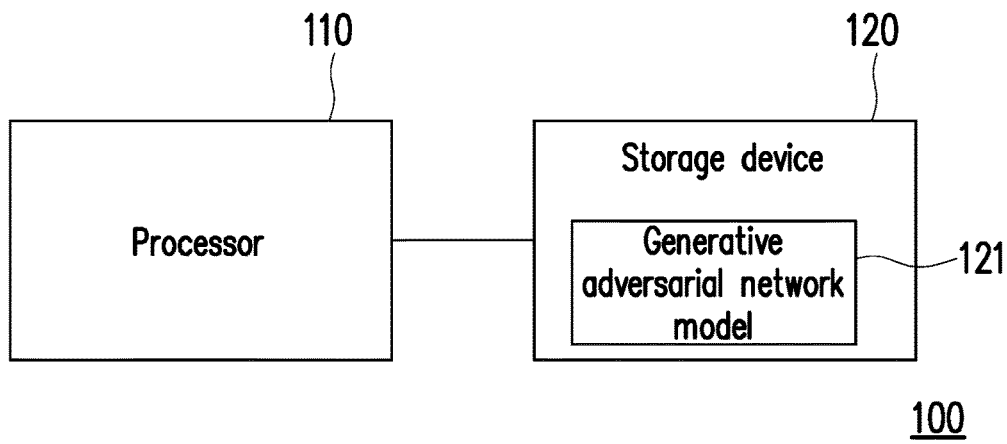
FIG. 1 is a schematic diagram of an electronic device according to an embodiment of the disclosure.

In order to make the contents of the disclosure easier to understand, the following embodiments are specifically cited as examples on which the disclosure may be implemented. Wherever possible, the originals/components/steps with the same reference numerals in the drawings and embodiments represent the same or similar parts.

FIG. 1 is a schematic diagram of an electronic device according to an embodiment of the disclosure. Referring to FIG. 1, an electronic device 100 includes a processor 110 and a storage device 120. The storage device 120 may store a generative adversarial network (GAN) model 121. The processor 110 is coupled to the storage device 120. In the embodiment, the processor 110 may execute the generative adversarial network model 121. The generative adversarial network model 121 may include a generator network model (a generative network) and a discriminator network model (a discriminative network). The processor 110 may generate a new sample picture to replace an original sample picture in a process in which the generator network model and the discriminator network model are trained and contest with each other. Hence, a trained generator network model may generate a new changed picture having a set of pattern characteristics with a part of pattern characteristics of the original sample picture but different from the original sample picture.

In the embodiment, the processor 110 may be, for example, a central processing unit (CPU), a graphic processing unit (GPU), or other programmable general-purpose or special-purpose microprocessors, a digital signal processor (DSP), a programmable controller, an application-specific integrated circuit (ASIC), a programmable logic device (PLD), or other similar processing devices, or any combination of the above devices. The storage device 120 may be, for example, a dynamic random access memory (DRAM), a flash memory, or a non-volatile random access memory (NVRAM). The storage device 120 may store and provide the generative adversarial network model 121, related algorithms, and picture data for the processor 110 to access and execute.

Figure 2:
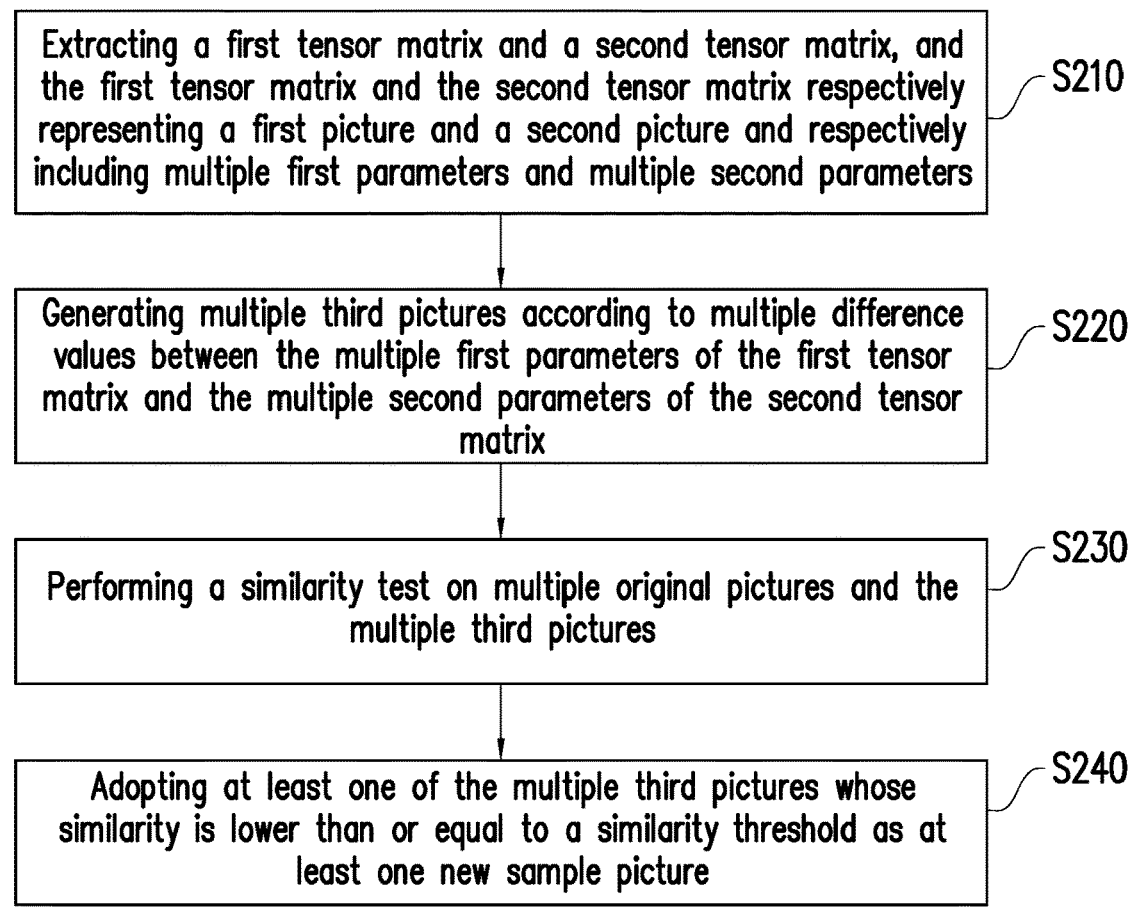
FIG. 2 is a flowchart of a training method according to an embodiment of the disclosure.

FIG. 2 is a flowchart of a training method according to an embodiment of the disclosure. Referring to FIG. 1 and FIG. 2, the electronic device 100 may execute the following steps S210 to S240 to generate the new sample picture for training the generator network model in the generative adversarial network model 121. The processor 110 may execute the generative adversarial network model 121. In step S210, the processor 110 may extract a first tensor matrix and a second tensor matrix from the generator network model. The first tensor matrix and the second tensor matrix respectively represent a first picture and a second picture and respectively include multiple first parameters and multiple second parameters. The first parameters and the second parameters refer to multiple vector values respectively in the first tensor matrix and the second tensor matrix. For example, a tensor matrix may be a 3D matrix, and multiple parameters of the tensor matrix may include multiple vector values of the X direction, multiple vector values of the Y direction, and multiple vector values of the Z direction in a vector space. In step S220, the processor 110 may generate multiple third pictures according to multiple difference values between the multiple first parameters of the first tensor matrix and the multiple second parameters of the second tensor matrix. In step S230, the processor 110 may perform a similarity test on multiple original pictures and the multiple third pictures. In step S240, the processor 110 adopts at least one of the multiple third pictures whose similarity is lower than or equal to a similarity threshold as at least one new sample picture.

For example, referring to FIG. 3A to FIG. 3F, FIG. 3A to FIG. 3F are schematic diagrams of multiple pictures according to an embodiment of the disclosure. In the embodiment, when initial training of the generative adversarial network model 121 is stable, the processor 110 may randomly extract a first tensor matrix and a second tensor matrix from a latent space of the generator network model to generate multiple first pictures 320 of FIG. 3B and second pictures 350 of FIG. 3E that are, for example, similar to original pictures 310 and 340 shown in FIG. 3A and FIG. 3D. The first tensor matrix may display picture content of the first picture 320, and the second tensor matrix may display picture content of the second picture 350. The original pictures 310 and 340 respectively have patterns 311 and 341. The first picture 320 has a pattern 321, and the second picture 350 has a pattern 351. Hence, the pattern 321 of the first picture 320 may have a pattern characteristic that is entirely similar to the pattern 311 of the original picture 310, and the pattern 351 of the second picture 350 may have a pattern characteristic that is entirely similar to the pattern 341 of the original picture 340.

Next, the processor 110 may generate, for example, third pictures 330 and 360 shown in FIG. 3C and FIG. 3E according to difference values between the multiple first parameters of the first tensor matrix of the first picture 320 and the multiple second parameters of the second tensor matrix of the second picture 350. Patterns 331 and 361 of the third pictures 330 and 360 are patterns with new characteristics in a process in which the pattern 321 gradually changes into the pattern 351 (or the pattern 351 gradually changes into the pattern 321). It is worth noting that when similarity between the third picture 330 and the original pictures 310 and 340 is lower than or equal to the similarity threshold, the processor 110 adopts the third picture 330 as a new sample picture. Similarly, when similarity between the third picture 360 and the original pictures 310 and 340 is lower than or equal to the similarity threshold, the processor 110 adopts the third picture 360 as the new sample picture.

In other words, the processor 110 of the embodiment may generate the new sample picture on the basis of pattern characteristics of the patterns 311 and 341 of the original pictures 310 and 340, and a pattern of the new sample picture may be different from the patterns 311 and 341 of the original pictures 310 and 340 to some extent and thus not too similar to the patterns 311 and 341 of the original pictures 310 and 340. With multiple times of recursion training, the processor 110 may use the new sample pictures added each time to gradually replace pictures of an original training data set. In addition, after the recursive training of the generator network model and the discriminator network model of the generative adversarial network model 121, a trained generator network model may generate the patterns 331 and 361 of the third pictures 330 and 360 that may be discriminated by the discriminator network model and have pattern characteristics different from the patterns 331 and 341 of the original pictures 310 and 340, rather than the patterns 321 and 351 of the first picture 320 and the second picture 350 that are similar to the patterns 331 and 341 of the original pictures 310 and 340.

Figure 4:
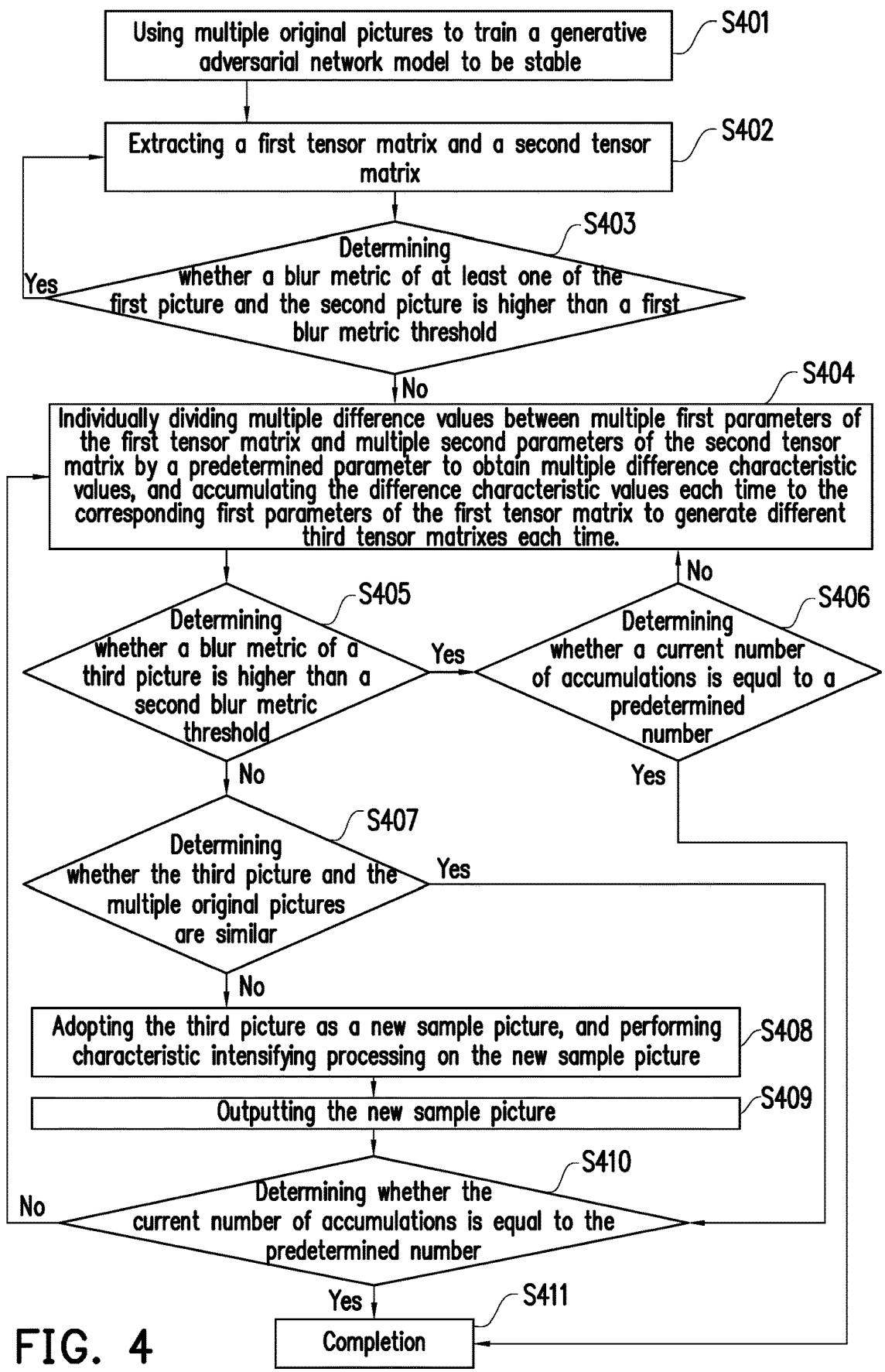
FIG. 4 is a flowchart of a training method according to another embodiment of the disclosure.
Figure 5:
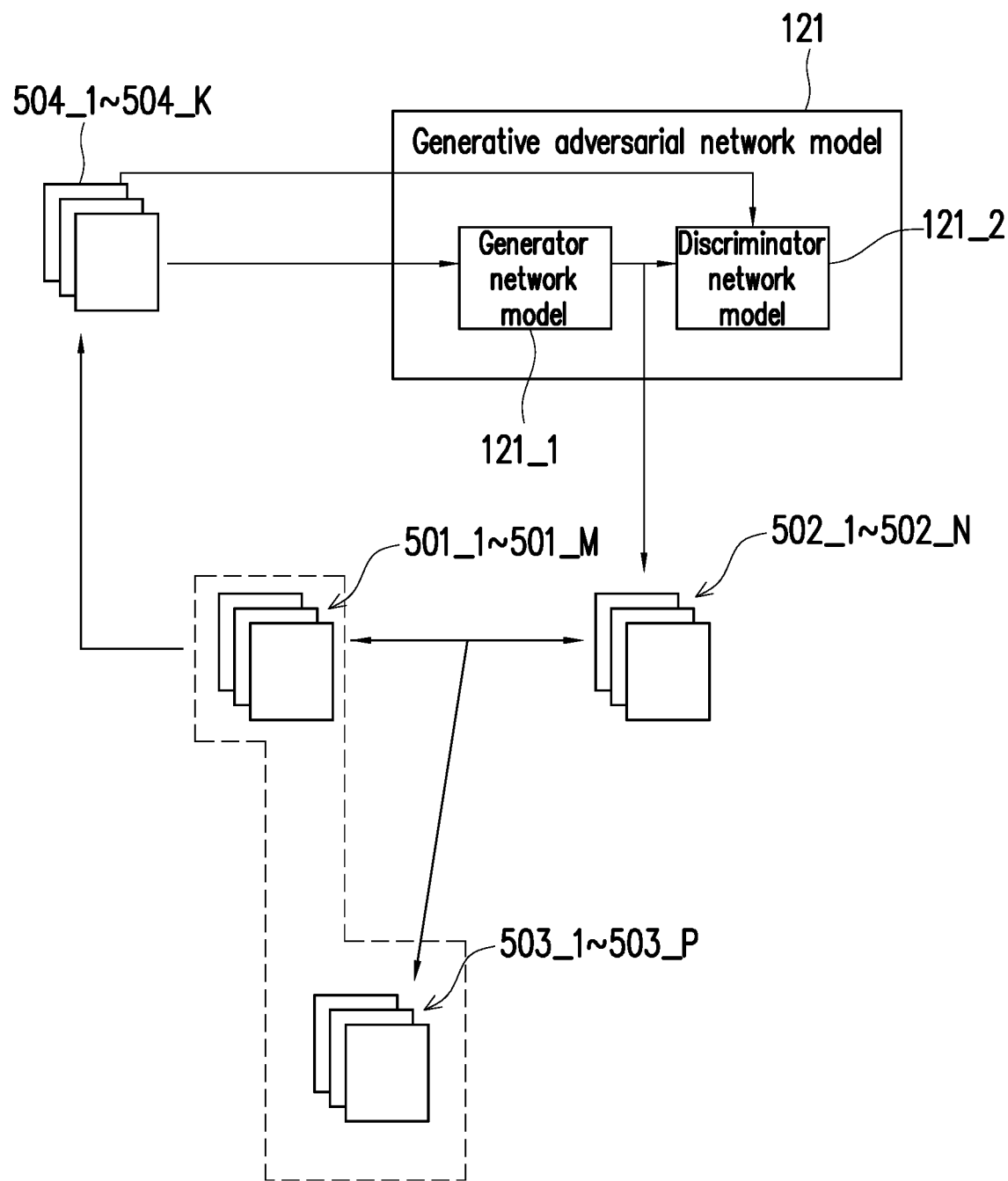
FIG. 5 is a flowchart of training a generator network model according to an embodiment of the disclosure.

FIG. 4 is a flowchart of a training method according to another embodiment of the disclosure. FIG. 5 is a flowchart of training a generative adversarial network model according to an embodiment of the disclosure. Referring to FIG. 1, FIG. 4, and FIG. 5, the electronic device 100 may execute the following steps S401 to S411 to train the generative adversarial network model 121.

In step S401, the processor 110 may first use multiple original pictures 501_1 to 501_M to train the generative adversarial network model 121 to be stable, and M is a positive integer.

In step S402, the processor 110 executes the generative adversarial network model 121 to randomly extract a first tensor matrix and a second tensor matrix in a latent space of a generator network model 121_1 of the generative adversarial network model 121. The first tensor matrix and the second tensor matrix respectively represent a first picture and a second picture, such as the first picture 320 of FIG. 3B and the second picture 350 of FIG. 3D. In this way, the processor 110 may find out a picture, which is not displayed, in the latent space of the generator network model 121_1 of the generative adversarial network model 121.

In step S403, the processor determines whether a blur metric of at least one of the first picture and the second picture is higher than a first blur metric threshold. If yes, the processor 110 executes step S402 again. If not, the processor 110 executes step S404. In the embodiment, based on that the blur metric of at least one of the first picture and the second picture is higher than the first blur metric threshold, the processor 110 may extract at least one of a new first tensor matrix and a new second tensor matrix again from the generator network model. In other words, the processor 110 of the embodiment may avoid using a picture with an overly blur pattern. In the embodiment, the processor 110 may determine a blur metric of the first picture and a blur metric of the second picture through at least one of a Laplace edge computation and a contrast test.

In step S404, the processor 110 individually divides the multiple difference values between the multiple first parameters of the first tensor matrix (e.g. the 3D matrix) of the first picture and the multiple second parameters of the second tensor matrix (e.g. the 3D matrix) of the second picture by a predetermined parameter to obtain multiple difference characteristic values, and the processor 110 accumulates the difference characteristic values each time to the corresponding first parameters of the first tensor matrix to generate different third tensor matrixes each time. The multiple different third tensor matrixes represent multiple different third pictures. In addition, the predetermined parameter may correspond to a number of times of generating the third pictures, which is a number of the third pictures generated in a complete training process. For example, if the predetermined parameter is 10, it means that the difference characteristic value is divided by 10. Hence, the multiple first parameters of the first tensor matrix are accumulated for 10 times to generate 10 third pictures (generate different 10 third tensor matrixes). In addition, it is worth noting that an overall value of a tensor matrix of the tenth third picture is equal to an overall value of the second tensor matrix of the second picture. Hence, pattern content of the tenth third picture is the same as pattern content of the second picture.

In step S405, the processor 110 determines whether a blur metric of the third picture is higher than a second blur metric threshold. If yes, the processor 110 executes step S406. If not, the processor 110 executes step S407. In the embodiment, based on that the blur metric of the third picture is higher than the second blur metric threshold, processor 110 may remove the third picture generated in a current accumulating operation. In other words, the processor 110 of the embodiment may avoid using the third picture with an overly blur pattern. In the embodiment, the processor 110 may determine the blur metric of the third picture through at least one of a Laplace edge computation and a contrast test.

In step S406, the processor 110 determines whether a current number of accumulations is equal to a predetermined number. If yes, the processor 110 executes step S411 to complete the process. If not, the processor 110 executes step S404 to perform another accumulating operation.

In step S407, the processor 110 determines whether the third picture and the multiple original pictures are similar. If yes, the processor 110 executes step S410. If not, the processor 110 executes step S408. In the embodiment, the processor 110 may use a fully connected layer (FC layer) in convolutional neural networks (CNN) to perform a similarity test on the third picture generated in the current accumulating operation and the original pictures 501_1 to 501_M of an original training data set. It is worth noting that when similarity between the third picture generated in the current accumulating operation and each of the original pictures 501_1 to 501_M is lower than or equal to the similarity threshold, the processor 110 adopts the third picture 330 as the new sample picture. In other words, when the third picture generated in the current accumulating operation is too similar to one of the original pictures 501_1 to 501_M of the original training data set, the processor 110 removes the third picture generated in the current accumulating operation. When the third picture generated in the current accumulating operation is not similar to one of the original pictures 501_1 to 501_M of the original training data set (i.e. they are different), the processor 110 executes step S408.

In step S408, the processor 110 adopts the third picture generated in the current accumulating operation as the new sample picture and performs the characteristic intensifying process on the new sample picture. In the embodiment, the characteristic intensifying process includes performing at least one of the gamma filtering process (e.g. the gamma correction) and the inverse filtering process on the new sample picture. Hence, the processor 110 may further process the new sample picture into a picture with a clear pattern and a distinct pattern characteristic. In step S409, the processor 110 outputs the new sample picture. In step S410, the processor 110 determines whether the current number of accumulations is equal to the predetermined number. If yes, the processor 110 executes step S411 to complete the process. If not, the processor 110 executes step S404 to perform another accumulating operation.

Specifically, as shown in FIG. 5, the processor 110 may remove an overly blur picture among third pictures 502_1 to 502_N and compare the third pictures 502_1 to 502_N and the original pictures 501_1 to 501_M of the original training data set to exclude a picture that is too similar to the original pictures 501_1 to 501_M. N is a positive integer. Hence, the processor 110 may adopt remaining third pictures after exclusion as new sample pictures 503_1 to 503_P, and P is a positive integer. Next, the processor 110 may use the new sample pictures 503_1 to 503_P to replace a part of the original pictures 501_1 to 501_M of the original training data set to generate pictures 504_1 to 504_K of a new training data set, and K is a positive integer. In the embodiment, the processor 110 may use the new sample pictures 503_1 to 503_P to train a discriminator network model 120_2 of the generative adversarial network model 121 so that the discriminator network model 120_2 may regard patterns of the new sample pictures 503_1 to 503_P as subjects that may be kept in a next discriminative operation. In addition, the processor may use the pictures 504_1 to 504_K of the new training data set to retrain the generator network model 121_1 of the generative adversarial network model 121 so that the generator network model 121_1 probably may generate a picture that is different from the original pictures 501_1 to 501_M and has pattern characteristic variety in a next picture generation (illustration) operation.

The pictures 504_1 to 504_K of the new training data set may include the new sample pictures 503_1 to 503_P and a part of the original pictures 501_1 to 501_M. In other words, the new sample pictures 503_1 to 503_P may replace the other part of the original pictures 501_1 to 501_M. In addition, when the generator network model 121_1 and the discriminator network model 120_2 are trained to be stable, the processor 110 may execute steps S401 to S411 again. Similarly, after multiple times of recursive execution of the processor 110, the original pictures 501_1 to 501_M may be completely replaced with the new sample pictures. As a result, the generative adversarial network model 121 after a recursive training epoch may completely output a picture that is different from the original pictures 501_1 to 501_M and has pattern characteristic variety.

The accumulating operation is described in detail below. For example, a first tensor matrix T1 (e.g. a 3D matrix) represents the first picture, and a second tensor matrix T2 (e.g. a 3D matrix) represents the second picture. For example, the predetermined parameter is 200 (i.e. N=200). A difference matrix D1 having multiple difference values may be obtained through subtraction of multiple first parameters of the first tensor matrix T1 and multiple second parameters of the second tensor matrix T2 ((D1=(T2−T1)) (The difference matrix D1 is a 3D matrix), and a difference characteristic matrix D2 having multiple difference characteristic values may be obtained by individually dividing the multiple difference values in the difference matrix D1 by 200 (D2=D1/200). Hence, the processor 110 may accumulate the difference characteristic values of the difference characteristic matrix D2 each time (200 times) to the corresponding first parameters of the first tensor matrix T1 to generate different third tensor matrixes T3_1 to T3_200 of the third pictures.

The third tensor matrix T3_1 of the third picture generated in the first accumulation may be generated through a matrix computation: T3_1=T1+1×D2. The third tensor matrix T3_2 of the third picture generated in the second accumulation may be generated through a matrix computation: T3_2=T1+ 2×D2. The third tensor matrix T3_3 of the third picture generated in the third accumulation may be generated through a matrix computation: T3_3=T1+3×D2. Similarly, the third tensor matrix T3_200 of the third picture generated in the 200th accumulation may be generated through a matrix computation: T3_200=T1+200×D2, and the third tensor matrix T3_200 of the third picture generated in the 200th accumulation is equal to the second tensor matrix T2 of the second picture. In other words, the processor 110 may generate third pictures 502_1 to 502_199 (199 pictures), and the third pictures 502_1 to 502_199 are the result in which the first picture gradually changes into the second picture.

Next, the processor 110 determines blur metrics and similarity of the third pictures 502_1 to 502_199. When the processor 110 determines that at least one of the blur metrics of the third pictures 502_1 to 502_199 is higher than the second blur metric threshold, the processor 110 removes an overly blur picture and performs the similarity test on remaining third pictures. In addition, after the processor 110 excludes pictures that is too similar to the original pictures 501_1 to 501_M, assuming that 10 pictures are left, the processor 110 may, for example, adopt the 10 pictures with new pattern characteristic changes as 10 new sample pictures to replace a part of the original pictures 501_1 to 501_M. Hence, the processor 110 may use the pictures 504_1 to 504_K of the new training data set including the 10 new sample pictures to train the generative adversarial network model 121 again.

In summary of the above, the training method of the generative adversarial network model and the electronic device for execution of the generative adversarial network model of the disclosure may effectively generate the multiple sample pictures whose pattern characteristics change gradually. Furthermore, with the blur metric and similarity tests, the pictures with clear patterns and having new pattern characteristic changes may be kept as new training data. As a result, after the generative adversarial network model of the disclosure is trained, the generative adversarial network model may have a function of generating creative and new pictures with clear patterns.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A training method of a generator network model, the method comprising:
   extracting a first tensor matrix and a second tensor matrix, wherein the first tensor matrix and the second tensor matrix respectively represent a first picture and a second picture and respectively comprise a plurality of first parameters and a plurality of second parameters;
   generating a plurality of third pictures according to a plurality of difference values between the plurality of first parameters of the first tensor matrix and the plurality of second parameters of the second tensor matrix;
   performing a similarity test on a plurality of original pictures and the third pictures; and
   adopting at least one of the third pictures whose similarity is lower than or equal to a similarity threshold as at least one new sample picture.

2. The training method according to claim 1, wherein generating the third pictures comprises:
   individually dividing the difference values by a predetermined parameter to obtain a plurality of difference characteristic values; and
   accumulating the difference characteristic values each time to the corresponding first parameters of the first tensor matrix to generate a plurality of different third tensor matrixes each time, wherein the third tensor matrixes represent the third pictures.

3. The training method according to claim 1, further comprising:
   based on a blur metric of at least one of the first picture and the second picture higher than a first blur metric threshold, extracting at least one of a new first tensor matrix and a new second tensor matrix again.

4. The training method according to claim 3, further comprising:
   determining the blur metric of the at least one of the first picture and the second picture through a Laplace edge computation or a contrast test.

5. The training method according to claim 1, wherein before performing the similarity test, the method further comprises:
   removing at least one of the third pictures whose blur metric is higher than a second blur metric threshold to perform the similarity test on remaining third pictures.

6. The training method according to claim 5, wherein before performing the similarity test, the method further comprises:
   determining blur metrics of the third pictures through at least one of a Laplace edge computation and a contrast test.

7. The training method according to claim 1, further comprising:
   performing a characteristic intensifying process on the at least one new sample picture.

8. The training method according to claim 7, wherein the characteristic intensifying process comprises performing at least one of a gamma filtering process and an inverse filtering process on the at least one new sample picture.

9. The training method according to claim 1, wherein before extracting the first tensor matrix and the second tensor matrix, a generative adversarial network model comprising the generator network model is trained to be stable through the original pictures.

10. An electronic device adapted for execution of a generator network model, the electronic device comprising:
a storage device configured to store the generator network model; and
a processor coupled to the storage device and configured to execute the generator network model,
wherein the processor extracts a first tensor matrix and a second tensor matrix from the generator network model, the first tensor matrix and the second tensor matrix respectively represent a first picture and a second picture and respectively comprise a plurality of first parameters and a plurality of second parameters, the processor generates a plurality of third pictures according to a plurality of difference values between the plurality of first parameters of the first tensor matrix and the plurality of second parameters of the second tensor matrix,
wherein the processor performs a similarity test on a plurality of original pictures and the third pictures, and the processor adopts at least one of the third pictures whose similarity is lower than or equal to a similarity threshold as at least one new sample picture.

11. The electronic device according to claim 10, wherein the processor individually divides the difference values by a predetermined parameter to obtain a plurality of difference characteristic values, and the processor accumulates the difference characteristic values each time to the corresponding first parameters of the first tensor matrix to generate a plurality of different third tensor matrixes each time, and the third tensor matrixes represent the third pictures.

12. The electronic device according to claim 10, wherein, based on a blur metric of at least one of the first picture and the second picture higher than a first blur metric threshold, the processor extracts at least one of a new first tensor matrix and a new second tensor matrix again through a generator.

13. The electronic device according to claim 12, wherein the processor determines the blur metric of the at least one of the first picture and the second picture through a Laplace edge computation or a contrast test.

14. The electronic device according to claim 10, wherein the processor removes at least one of the third pictures whose blur metric is higher than a second blur metric threshold to perform the similarity test on remaining third pictures.

15. The electronic device according to claim 14, wherein the processor determines blur metric of the third pictures through at least one of a Laplace edge computation and a contrast test.

16. The electronic device according to claim 10, wherein the processor performs a characteristic intensifying process on the at least one new sample picture.

17. The electronic device according to claim 16, wherein the characteristic intensifying process comprises performing at least one of a gamma filtering process and an inverse filtering process on the at least one new sample picture.

18. The training method according to claim 10, wherein before extracting the first tensor matrix and the second tensor matrix, the processor trains a generative adversarial network model comprising the generator network model to be stable by using the original pictures.

* * * * *